Aug. 13, 1968  K. H. BACON  3,397,138
GAS SEPARATION EMPLOYING WORK EXPANSION OF FEED
AND FRACTIONATOR OVERHEAD
Filed Dec. 2, 1965

INVENTOR
Kenneth H. Bacon

3,397,138
GAS SEPARATION EMPLOYING WORK EXPANSION OF FEED AND FRACTIONATOR OVERHEAD
Kenneth H. Bacon, Tulsa, Okla., assignor to Warren Petroleum Corporation, Tulsa, Okla., a corporation of Delaware
Filed Dec. 2, 1965, Ser. No. 511,150
6 Claims. (Cl. 208—340)

ABSTRACT OF THE DISCLOSURE

The process for the recovery of a relatively high boiling component from a gaseous mixture by cooling the gaseous mixture through an initial heat exchange with vapor produced subsequently in the process, substantially adiabatically expanding the cooled mixture in a work recovery engine whereby mechanical energy is obtained and the mixture is further cooled to form a vapor-liquid mixture, separating this vapor and the liquid, fractionally distilling the liquid to form a second vapor, removing the relatively high boiling component as bottoms, heat exchanging the second vapor with the liquid and the previously formed vapor to provide an uncondensed vapor and a condensed liquid, combining the previously formed vapor and the uncondensed vapor, subjecting the combined vapors to substantially adiabatic expansion in a work recovery engine whereby such vapors are cooled and mechanical energy is obtained, heat exchanging the combined and cooled vapors with the gaseous mixture in the initial step and employing the total mechanical energy obtained at least to recompress partly such vapors after heat exchange with the incoming gaseous mixture.

---

This invention relates to improved procedures for separating components of a gaseous mixture. In particular it relates to an improved procedure for the separation of high-boiling components from a hydrocarbon gaseous mixture under elevated pressure. More particularly, it relates to an improved procedure for separating gasoline from a natural gas mixture at elevated pressure and, when desirable, recompressing a portion of the natural gas mixture to about its original pressure.

Petroleum wells produce an effluent consisting of gases and crude liquid oil. The gas and oil are usually separated near the well-head and the gases, which ordinarily contain useful light hydrocarbon fractions, are subjected to special treatment in order to recover the useful fractions. Of especial interest are the fractions suitable for gasoline, propane and butane useful as fuels, and ethane useful as a raw material in the manufacture of ethylene.

The components are recovered in the modern "gasoline recovery" plant, conventionally of the refrigerated absorption type. In this type of plant the gas, after its separation at the well-head from associated crude oil, is scrubbed, compressed in several stages to about 750 to 1000 p.s.i., and fed to an absorption tower. In the tower the useful components of the gas are absorbed by oil. This absorption oil is denominated "lean oil" when the liquids have been absorbed in it.

The rich oil from the absorber is initially subjected to a flash treatment in which some of the very light ends, e.g. methane and ethane, are removed. These ends are usually recompressed to sales pressure. The rich oil is then heated from ambient temperature to about 250° F. by means of conventional heat exchangers and fed to a deethanizer tower operated at 300°–400° F. and 150–400 p.s.i. In this distillation column most of the remaining ethane and methane are "stripped" from the rich oil.

A countercurrent flow of fresh lean oil aids control of production loss. These remaining light ends may also be compressed to sales pressure. They are often burned as fuel at the plant. The rich oil is then heated in a furnace and pumped to a distillation column at about 500° F. A reflux condenser and cooling tower are operated in association with this column. The desired product is distilled off and cooled. It is then separated into its various components, typically by distillation columns and heat exchangers. Ethane, propane, butane, and gasoline are stored separately.

The adsorbent oil from the distillation, now devoid of natural gas liquids, is recycled to a distillation column where impurities are removed and thence to lean oil storage tanks. From storage it is pumped by way of surge tanks, into the absorption column at about 750 p.s.i., where it is contacted with fresh hydrocarbon gas.

Disadvantages of the modern gasoline plant include the expense of its equipment and absorbent oil wastage, the complexity of its operation, and its relatively poor adaptability to ethane recovery.

It is an object of the present invention to provide a method for the separation of various components from a gaseous mixture at elevated pressure.

It is an object of this invention to provide a method for the recovery of higher boiling components of a hydrocarbon gas mixture at elevated pressure, particularly adaptable to the simultaneous recovery of one or more of the other components thereof.

It is a further object of this invention to provide a method for the recovery of gasoline from a hydrocarbon gas mixture at elevated pressure.

It is another object of this invention to provide a method for the recovery of ethane from a hydrocarbon gas mixture at elevated pressure.

It is another object of this invention to provide a method for recompressing a hydrocarbon gas mixture after some of its components have been separated from it.

It is a still further objective of this invention to provide a method for recovering energy from a gas mixture under high pressure.

Other objects will appear hereinafter.

These and other objects of my invention are accomplished by cooling a gas mixture at elevated pressure by heat exchange with a vapor subsequently produced, substantially adiabatically expanding the cooled gas thereby recovering mechanical energy in the process and cooling the gas further, and fractionally distilling the expanded mixture, removing as bottoms the relatively high boiling components. The mechanical energy recovered in the adiabatic expansion may be utilized to recompress the vapor product of the distillation after those vapors have been used to cool the incoming gases. The mechanical energy recovered in the adiabatic expansion may of course be utilized to generate electricity or for other purposes.

In the following I have set forth certain preferred embodiments of my invention, but it is to be understood that they are given by way of illustration and not in limitation thereof.

In the accompanying drawing I have illustrated diagrammatically apparatus in which my invention may be carried out.

My invention may be best illustrated in connection with the separation of higher boiling components of a natural gas mixture. To assist in this illustration I will refer to the accompanying drawing.

A natural gas previously dehydrated or treated with ethylene glycol for water hydrate control and having the composition, temperature, pressure, etc. shown in column 1 of Table I is introduced through conduit 1 into a heat exchanger 72 where it is cooled to a lower temperature by heat exchange with cold gases flowing through the heat exchanger via conduit 113. The precooled gases then flow through conduit 2. The temperature and composition of the gases in conduit 2 are shown in column 2V of Table I. The small amount of liquid in conduit 2 is similarly described in column 2L. The gases in conduit 2 are then expanded in turbo or reciprocating expander 50 under substantially adiabatic conditions. The resultant gas mixture must be at a temperature below the critical temperature of the component to be recovered and also should be at a temperature and pressure which will cause this component substantially to condense. The resultant cold gas mixture flows into the flash accumulator 54 where an overhead gas stream 3 is removed having the composition shown in column 3 of Table 1 and a liquid stream is removed through conduit 4 having the composition shown in column 4 of Table I.

The liquid stream in conduit 4 is passed through heat exchanger 56 and then flows via conduit 6 into fractionator 58. The composition of the stream in conduit 6 is shown in columns 6L and 6V of Table I. This liquid fraction is then fractionated in fractionator 58, heat for the fractionation being introduced through reboiler 62. The bottoms fraction in fractionator 58 is withdrawn through conduit 60, reheated in boiler 62 and the heated liquid being re-introduced into fractionator 58 through conduit 64. A liquid constituting the higher boiling components of the natural gas is removed through conduit 17. This fractionation is carried out in such a manner as to yield a stabilized bottoms fraction of the desired composition. In connection with natural gas it would be operated at such a temperature and pressure as to yield either a de-methanized or a de-ethanized bottoms fraction. The composition, etc. of this product removed through conduit 17 in this particular example is shown in column 17 of table 1.

The vapors removed in fractionator 58 flow through conduit 7 into heat exchanger 56 where the liquid flowing into fractionator 58 via conduit 6 is preheated and the fractionated vapors in conduit 7 are cooled. These cooled, fractionated vapors then flow through conduit 8, heat exchanger 66 and conduit 9 into flash accumulator 68. The composition of the hydrocarbon flowing through conduits 7, 8 and 9 are shown in columns 7, 8 and 9 of Table I. In heat exchanger 66 the fractionated vapors are further cooled by heat exchange with gases separated in flash accumulator 54 and flowing to heat exchanger 66 via conduit 3.

A liquid portion is separated in flash accumulator 68, is withdrawn through conduit 10 and is returned to fractionator 58 as reflux. The gases separated in flash accumulator 68 are removed through conduit 11 and combined with the gas stream of conduit 5. This combined mixture flows through conduit 12 into a second turbo or reciprocating expander 70. The compositions of the gas streams in conduits 5, 11 and 12 are shown in the corresponding columns of Table I. In expander 70 the cold gases are subjected to substantially adiabatic expansion for the second time and the work involved in this expansion is recovered. Some condensation occurs. The expanded and still further cooled stream then flows through heat exchanger 72 via conduit 13 where the feed gas flowing through conduit 1 is precooled to a low temperature and the liquids from conduit 13 are again vaporized. This gas stream then flows from heat exchanger 72 into a two-stage compressor (indicated by the numerals 74 and 76) via conduits 14 and 15. The compressed gases are removed through conduit 16. The compositions of the streams in conduits 13, 14, 15 and 16 are given in columns 13V and 13L, 14, 15 and 16 of Table 1.

TABLE I (Part 1)

|  | 1 | 2L | 2V | 3 | 4 | 5 | 6V | 6L | 7 | 8 |
|---|---|---|---|---|---|---|---|---|---|---|
| M./hr.: |  |  |  |  |  |  |  |  |  |  |
| $C_1$ | 93.65 | 90.33 | 3.32 | 90.21 | 3.44 | 90.21 | 2.95 | .49 | 4.27 | 3.83 |
| $C_2$ | 3.85 | 3.13 | .72 | 2.23 | 1.62 | 2.23 | .64 | .98 | 6.04 | 2.78 |
| $C_3$ | 1.13 | .54 | .59 | .12 | 1.01 | .12 | .11 | .90 | .27 | .05 |
| $IC_4$ | .15 | .05 | .10 |  | .15 |  | .01 | .14 |  |  |
| $C_4$ | .41 | .08 | .33 |  | .41 |  | .01 | .40 |  |  |
| $IC_5$ | .16 | .01 | .15 |  | .16 |  |  | .16 |  |  |
| $C_5$ | .20 | .01 | .19 |  | .20 |  |  | .20 |  |  |
| $C_6$ | .24 |  | .24 |  | .24 |  |  | .24 |  |  |
| $C_7+$ | .21 |  | .21 |  | .21 |  |  | .21 |  |  |
|  | 100.00 | 94.15 | 5.85 | 92.56 | 7.44 | 92.56 | 2.43 | 3.72 | 10.68 | 6.66 |
| Temp. °F | 80 | −64 | −64 | −130 | −130 | −119 | −30 | −30 | −15 | −46 |
| P.s.i.a | 750 | 750 | 750 | 250 | 250 | 245 | 248 | 248 | 248 | 248 |
| MW | 17.17 | 16.74 | 33.35 | 16.42 | 33.82 | 16.42 | 19.51 | 48.13 | 24.95 | 22.11 |
| Lb./hr | 1,717.11 | 1,575.99 | 195.12 | 1,519.49 | 251.61 | 1,519.49 | 72.58 | 179.04 | 266.42 | 147.23 |
| B.t.u./lb | 315 |  |  |  |  |  |  |  |  |  |
| M B.T.U./hr | [1] 557.865 | [1] 343.887 | [2] 15.207 | [1] 333.423 | [2] 10.247 | [1] 341.716 | [1] 19.290 | [2] 15.052 | [1] 72.029 | [1] 137.434 |

(Part 2)

|  | 9 | 10 | 11 | 13V | 13L | 14 | 15 | 16 | 17 |
|---|---|---|---|---|---|---|---|---|---|
| M./hr.: |  |  |  |  |  |  |  |  |  |
| $C_1$ | .44 | .83 | 3.44 | 93.62 | .03 | 93.65 | 93.65 | 93.65 |  |
| $C_2$ | 3.26 | 4.44 | 1.60 | 3.78 | .05 | 3.83 | 3.83 | 3.83 | .02 |
| $C_3$ | .32 | .35 | .02 | .10 | .04 | .14 | .14 | .14 | .99 |
| $IC_4$ |  |  |  |  |  |  |  |  | .15 |
| $C_4$ |  |  |  |  |  |  |  |  | .41 |
| $IC_5$ |  |  |  |  |  |  |  |  | .16 |
| $C_5$ |  |  |  |  |  |  |  |  | .20 |
| $C_6$ |  |  |  |  |  |  |  |  | .24 |
| $C_7+$ |  |  |  |  |  |  |  |  | .21 |
|  | 4.02 | 5.62 | 5.06 | 97.50 | .12 | 97.62 | 97.62 | 97.62 | 2.38 |
| Temp. °F | −46 | −60 | −60 | −166 | −166 | +65 | +153 | +255 | +184 |
| P.s.i.a | 248 | 245 | 245 | 100 | 100 | 95 | 267 | 750 | 248 |
| MW | 29.65 | 28.87 | 20.59 | 16.61 | 31.17 | 16.63 | 16.63 | 16.63 | 61.95 |
| Lb./hr | 119.19 | 162.25 | 104.18 | 1,619.92 | 3.74 | 1,623.66 | 1,623.66 | 1,623.66 | 147.44 |
| B.t.u./lb |  |  |  |  |  |  |  |  | 213 |
| M B.T.U./hr | [2] 10.500 | [2] 13.237 | [1] 26.404 | [1] 340.684 | [2] .071 | [1] 539.466 | (¹) | (¹) | [2] 31.405 |

[1] Vapor.   [2] Liquid.

In the example given, the energy recovered in expander 50 is 23.71 brake horsepower (BHP) and the energy recovered in expander 70 would be 22.32 BHP. This energy is applied to compressors 74 and 76 as illustrated diagrammatically in the drawing. The energy required to compress the gases in compressors 74 and 76 to bring these gases to the initial pressure of 750 p.s.i.a. would be 60.62 BHP in compressor 74 and 70.88 BHP in compressor 76. This means that an additional amount of energy amounting to 85.47 BHP must be supplied to compressors 74 and 76 by means of an electric motor, combustion gas turbine or steam turbine, or other energy source 78. It will, of course, be realized that either a one-stage compressor or a three- or greater-stage compressor could be used instead of the two-stage compressor illustrated.

It will be noticed that the work or energy output from the expansion in turbo expander 50 is derived from both high and low boiling components of the feed gas mixture, while the work obtained in expander 70 is derived only from expansion of the low boiling components. It follows that with 100% efficiencies no energy input would be required when the lower boiling components are recompressed to substantially the original pressure. As a matter of fact, there would be a favorable energy balance due to the fact that work energy derived from the higher boiling components is utilized in the recompression. Since energy recovery efficiencies do not approach this perfect value, it is necessary to introduce work energy for the recompression. It will be noted, however, that by operating in accordance with my invention this work energy input is greatly reduced because the energy contained in the higher boiling components is efficiently utilized in the recompression step. Also, the energy represented by the low temperature in the higher boiling components (subsequent to the first expansion) is efficiently recovered by using it to cool the lower boiling components prior to recompression.

Although the foregoing example illustrates my invention in connection with a natural gas mixture, it is evident that my improved procedure can be utilized for separating components of any gas mixture in which the components to be separated have sufficiently different boiling points that they can be separated as a liquid and vapor in a flashing operation. Thus, my invention may be advantageously employed to recover ethane from a mixture of methane and ethane. It may also be employed to recover LPG (liquefied petroleum gases) from a hydrocarbon gaseous stream such as natural gas.

Any work recovery engine may be used that would permit the adiabatic expansions required by the invention. A turbo-expander would be less efficient but perhaps preferred for large gas volumes. A reciprocating expander would have a higher efficiency and might be more appropriate for smaller volumes. In fact, if energy recovery is not desired, any apparatus permitting the requisite adiabatic expansion, for example, a Joule-Thomson reducing valve, might be used.

By the process of this invention, it may be seen that the entire cost of the absorbent oil system is saved. The large lean oil pumps, the rich oil still and furnace, and the oil itself are no longer necessary. Neither is there needed as much outside power for recompression, should that be desired. The instant process is also much simpler than the typical plant previously described, eliminating not only the absorbent oil system but the auxiliary refrigeration system as well. And, as it can be seen, the process of the invention is much more adaptable to ethane recovery on account of its direct isolation of the ethane. This is markedly advantageous compared with older processes which emphasized gasoline liquefaction and removed ethane at several points as an impurity.

I claim:
1. A process for the recovery of relatively high boiling components from a gaseous mixture under elevated pressure which comprises cooling the gaseous mixture in an initial step by heat exchange with vapor produced subsequently, substantially adiabatically expanding the cooled mixture in a first work recovery engine whereby mechanical energy is obtained and the mixture is further cooled and a vapor-liquid mixture is formed, separating the vapor-liquid mixture into first vapor and first liquid portions, fractionally distilling the first liquid portion of the expanded mixture to form a second vapor and a bottoms fraction containing high boiling components, removing the bottoms fraction containing relatively high boiling components as fractionator bottoms, heat exchanging the second vapor with the separated first liquid portion and the first vapor portion to form an uncondensed vapor and a condensed liquid, combining the first vapor portion and uncondensed vapor, subjecting the combined first and uncondensed vapors to substantially adiabatic expansion in a second work recovery engine whereby said vapors are cooled and mechanical energy is obtained, employing the combined expanded and cooled vapors to cool the gaseous mixture in the initial cooling step and employing the mechanical energy obtained from the first and second work recovery engines at least to recompress partly said combined vapors after heat exchange with the incoming gaseous mixture.

2. The process of claim 1 wherein the condensed liquid is returned as reflux to the fractional distillation step.

3. The process of claim 1 wherein the vapor-liquid mixture formed in the first work recovery engine is maintained at a temperature below the critical temperature of the high boiling component and at a temperature and pressure which will cause the high boiling components to condense.

4. A process for the recovery of gasoline from a natural gas mixture comprising gasoline and lower boiling components under elevated pressure which process comprises cooling the natural gas mixture in an initial step by heat exchange with vapor produced subsequently, substantially adiabatically expanding the cooled mixture in a first work recovery engine whereby mechanical energy is obtained and the mixture is further cooled and a vapor-liquid mixture is formed, separating the vapor-liquid mixture into first vapor and first liquid portions, fractionally distilling the first liquid portion of the expanded mixture to form a second vapor and a gasoline fraction, removing the gasoline fraction as fractionator bottoms, heat exchanging the second vapor with the separated first liquid portion and the first vapor portion to form an uncondensed vapor and a condensed liquid, combining the first vapor portion and uncondensed vapor, subjecting the combined first and uncondensed vapors to substantially adiabatic expansion in a second work recovery engine whereby said vapors are cooled and mechanical energy is obtained, employing the combined expanded and cooled vapors to cool the natural gas mixture in the initial cooling step and employing the mechanical energy obtained from the first and second work recovery engines at least to recompress partly said combined vapors after heat exchange with the incoming natural gas mixture.

5. The process of claim 4 wherein the condensed liquid is returned as reflux to the fractional distillation step.

6. The process of claim 4 wherein the vapor-liquid mixture formed in the first work recovery engine is maintained at a temperature below the critical temperature of the gasoline fraction and at a temperature and pressure which will cause the gasoline fraction to condense.

(References on following page)

References Cited

UNITED STATES PATENTS

| | | | |
|---|---|---|---|
| 2,608,070 | 8/1952 | Kapitza | 62—38 X |
| 2,658,360 | 11/1953 | Miller | 62—39 X |
| 2,716,332 | 8/1955 | Haynes | 62—39 X |
| 2,915,882 | 12/1959 | Schuftan | 62—38 X |
| 3,205,669 | 9/1965 | Grossmann | 62—38 X |
| 3,246,478 | 4/1966 | Kornemann et al. | 62—38 X |
| 3,292,381 | 12/1966 | Bludworth | 62—27 X |
| 3,316,725 | 5/1967 | Dennis | 62—39 X |

NORMAN YUDKOFF, *Primary Examiner.*

W. PRETKA, *Assistant Examiner.*

UNITED STATES PATENT OFFICE
CERTIFICATE OF CORRECTION

Patent No. 3,397,138

August 13, 1968

Kenneth H. Bacon

It is certified that error appears in the above identified patent and that said Letters Patent are hereby corrected as shown below:

Column 2, line 12, "adsorbent" should read -- absorbent --. Column 3, line 4, "113" should read -- 13 --. Column 4, line 7, "uow" should read -- flow --. Columns 3 and 4, TABLE I, (Part 1), the heading of the second column, "2L" should read -- 2V --; same TABLE I (Part 1), the heading of the third column, "2V" should read -- 2L --; same TABLE I (Part 1), eighth column, line 10 thereof, "243" should read -- 3.72 --; same TABLE I (Part 1), tenth column, third line thereof, ".27" should read -- .37 --.

Signed and sealed this 3rd day of February 1970.

(SEAL)
Attest:

Edward M. Fletcher, Jr.
Attesting Officer

WILLIAM E. SCHUYLER, JR.
Commissioner of Patents